United States Patent [19]

Kwiecinski

[11] 4,117,032
[45] Sep. 26, 1978

[54] WIRE COATING POWDER
[75] Inventor: James R. Kwiecinski, Wilkins Township, Allegheny County, Pa.
[73] Assignee: Westinghouse Electric Corp., Pittsburgh, Pa.
[21] Appl. No.: 726,036
[22] Filed: Sep. 23, 1976
[51] Int. Cl.² .............................................. C08L 77/00
[52] U.S. Cl. ..................... 260/857 PE; 260/857 PA; 428/375; 528/288; 528/289; 528/273; 528/279
[58] Field of Search .................. 260/857 PE, 857 PA, 260/857 PI

[56] References Cited
U.S. PATENT DOCUMENTS

| 3,415,903 | 12/1968 | Bottger | 260/857 PE |
|---|---|---|---|
| 3,555,113 | 1/1971 | Sattler | 260/857 PI |
| 3,919,144 | 11/1975 | Formaini | 260/857 PA |
| 4,008,195 | 2/1977 | Ishizuka | 260/857 PA |
| 4,018,742 | 4/1977 | Suzuki | 260/857 PE |

FOREIGN PATENT DOCUMENTS

| 45-9,104 | 2/1970 | Japan | 260/857 PI |
|---|---|---|---|
| 47-47,871 | 2/1972 | Japan | 260/857 PA |
| 1,093,734 | 12/1967 | United Kingdom | 260/857 PI |
| 1,101,024 | 1/1968 | United Kingdom | 260/857 PI |

OTHER PUBLICATIONS

Powder Coating; Detroit Society for Paint Technology, Journal of Paint Technology, vol. 44, No. 565, Feb. 1972.

Primary Examiner—Paul Lieberman
Attorney, Agent, or Firm—R. D. Fuerle

[57] ABSTRACT

A wire coating powder is prepared by first formulating a solventless, aromatic polyester-amide-imide which is the reaction product of an aromatic diamine, an aromatic compound consisting of trimellitic anhydride, acid, or acid halide, and about 35 to about 100 mole % in excess of the stoichiometric amount needed to react with said aromatic compound of polyol.

A coating powder is prepared by hot melt mixing, cooling, and grinding a mixture of the polyester-amide-imide with straight polyester and a reactive solid or liquid aromatic monomer or prepolymer.

20 Claims, No Drawings

WIRE COATING POWDER

BACKGROUND OF THE INVENTION

Coating powders are dry, solventless powders used to coat various metallic objects, including wire. To coat wire the powder is fluidized and charged while the wire is grounded. The charged powder clings to the wire and is melted in an oven to form the coating.

Coating powders have many advantages over wire enamels. Wire enamels require a solvent which means that energy must be used to evaporate the solvent and to incinerate it to prevent it from polluting the air. Also, a wire enamel coating must be applied in several passes which means that the start-up wire, which has not had the full number of passes, must be scrapped. While wire enamels have much superior heat shock resistance to coating powders, so far all efforts have failed to produce a coating powder having the chemical structure and therefore heat shock resistance of a wire enamel.

PRIOR ART

U.S. Pat. No. 3,555,113 discloses a polyester-amide-imide wire enamel.

U.S. Pat. No. 3,931,418 discloses a solventless thermosetting resin for coating electrical conductors made from polyhydric alcohols, carboxylic acids and optional aliphatic carboxylic acids and amines.

U.S. Pat. No. 3,426,008, which discloses polyester-polyimide wire enamels, contains the following paragraph:

"In place of applying the polyester-polyimide resin in a solvent to the electrical conductor the solvent can be removed from the resin and the wire or other electrical conductor in hot form passes through the powdered resin in the form of a fluidized bed in order to coat the resin on the wire or the like."

SUMMARY OF THE INVENTION

I have discovered that a polyester-amide-imide wire coating powder can be prepared using excess polyol instead of solvent. The wire coating powder of this invention has the polyester-amide-imide structure of a wire enamel but can be applied to wire in an electrostatic-fluidized bed like a coating powder.

The application can be made in a single pass thus simplifying the application and reducing scrap. No energy is wasted evaporating and burning solvents. The condensation polymer coating powder of this invention is at least a Class F powder (i.e., for use over 155° C).

DESCRIPTION OF THE INVENTION

The wire coating powder of this invention requires the preparation of three separate polymers or monomers, which are then hot melt-mixed together. The first is a polyester-amide-imide, the second is an aromatic straight polyester, and the third is a monomer or prepolymer. An optional fourth highly cross-linked polyester may also be included in the coating powder.

I. The Polyester-Amide-Imide

The polyester-amide-imide composition must contain ester, amide, and imide groups. The composition contains an aromatic diamine, about 100 to about 110 mole % (of the stoichiometric amount needed to react with the diamine) of a trimellitic compound, and about 35 to about 100 mole % in excess of the stoichiometric amount needed to react with the trimellitic compound of a polyol.

A. The Diamine

Suitable aromatic diamines include methylene dianiline, diamino phenyl sulfone, diamino phenyl ether, diamino pyridine, diamino toluene, and ethylene diamine. Meta phenylene diamine is preferred as its used results in high thermal stability.

B. The Trimellitic Compound

The trimellitic compound may be trimellitic anhydride (TMA), trimellitic acid, trimellitic acid halide, or mixtures thereof. Trimellitic anhydride is preferred because it is readily available and reacts more easily.

C. The Polyol

The polyol is a compound having at least two hydroxyl groups. A mixture of dihydroxy compound and trihydroxy compound in a molar ratio of about 8 to 1 to about 12 to 1 is preferred because too much of either lowers heat shock. Also, too much trihydroxy makes the composition infusible and too much dihydroxy makes it gummy. Suitable polyols include ethylene glycol, propylene glycol, tris (2-hydroxy ethyl) isocyanurate (THEIC), glycerol, and triethylene glycol. A mixture of about 85 to about 95 mole % ethylene glycol and about 5 to about 15 mole % (based on total polyol) triethylene glycol is preferred.

D. The Catalyst

The polyester-amide-imide composition also preferably includes about 0.01 to about 1% (by weight based on polyester-amide-imide composition weight) of a condensation catalyst. Suitable catalysts include tetra butyl titanate, litharge (lead oxide), tetra isopropyl titanate, and lead acetate. The preferred catalyst is tetra isopropyl titanate.

E. Optional Ingredients

The polyester-amide-imide composition also preferably includes about 3 to about 25 mole % (based on total moles in entire polyester-amide-imide composition) of an aromatic mono-anhydride or an aromatic di- or tri-acid or an aromatic di-ester. Suitable examples include trimellitic acid, dimethylterephthalate, isophthalic acid, terephthalic acid, and phthalic acid. A mixture of trimellitic acid (TMA) and dimethyl terephthalate (DMT) in a molar ratio range of 0 to 75 mole % (based on total of TMA plus DMT) of either is preferred because it gives good properties on the cured wire.

The polyester-amide-imide composition also preferably includes up to about 17 mole % (based on polyester-amide-imide) of an unsaturated anhydride or an unsaturated di-acid. Suitable examples include maleic anhydride, fumaric acid, or itaconic acid. Maleic anhydride is preferred because it is easy to react and inexpensive.

The composition may also contain up to 3% of a reflux agent such as xylene to wash sublimed dimethyl terephthalate out of the condenser during the reaction. The xylene evaporates and does not remain in the product.

The composition may also contain up to 0.5% of a solvent for the catalyst, such as cresylic acid, in order to disperse the catalyst in the composition. This solvent is not essential and is a minute percentage of the total composition. Also, the cresylic acid ester interchanges with an organic titanate such as isopropyl titanate to produce tetra cresylic titanate and an alcohol (such as isopropanol) which evaporates.

The polyester-amide-imide may be prepared by reacting the aromatic diamine, the trimellitic compound, and the polyol at about 180° to about 200° C until the fluid is clear. The optional ingredients are added and cooking continuous until the fluid is clear. It is then cooled rapidly to solidify it and is ground to a powder.

II. The Aromatic Straight Polyester

The aromatic straight polyester is separately prepared from a composition of about 25 to about 45 mole % (based on total straight polyester) of a non-cyclic polyol, about 5 to about 15 mole % (based on total straight polyester) of THEIC, and about 40 to about 60 mole % (based on total straight polyester) aromatic diacid or difunctional monoanhydride.

The non-cyclic polyol has 2 or 3 hydroxyls such as propylene glycol, glycerol, triethylene glycol, or ethylene glycol. Ethylene glycol is preferred because it is readily available and has better thermal stability.

The aromatic di-acid or di-functional mono-anhydride may be selected from compounds such as dimethyl terephthalate, terephthalic acid, isophthalic acid, phthalic acid, phthalic anhydride, and pyridine dicarboxylic acids. Dimethyl terephthalate is preferred because it gives good thermal stability and flexibility.

The aromatic straight polyester composition also preferably includes about 0.1 to about 0.5 mole % (based on total straight polyester) of a catalyst. Suitable catalysts include tetra butyl titanate, litharge, tetra isopropyl titanate, triphenyl phosphite, and lead acetate. The preferred catalyst is tetra isopropyl titanate because it works well.

The aromatic straight polyester composition also preferably includes up to about 15 mole % (based on total straight polyester) of an unsaturated anhydride or an unsaturated di-acid. Suitable examples include maleic anhydride, fumaric acid, and itaconic acid. Maleic anhydride is preferred because it gives good thermal stability.

The aromatic polyester is prepared by heating a mixture of the ingredients and cooking unit clear at about 200° to about 260° C. The mix is then cooled rapidly and ground to a powder.

III. The Monomer or Pre-Polymer

The coating powder composition also includes a reactive aromatic, monomer, pre-polymer, or mixture thereof. Suitable monomers or pre-polymers include tetra ethylene glycol diacrylate, triallyl cyanurate, triallyl isocyanurate, trimethylol propane triacrylate, THEIC triacrylate, bisphenol A diacrylate, and acrylamide. The preferred pre-polymer is a prepolymer of diallyl isophthalate, sold by FMC Corporation under the trademark DAPON M because it is a solid powder and it seems to permit a greater and smoother build.

IV. The Highly Cross-Linked Polyester

The coating powder composition also preferably includes about 10 to about 15% (by weight based on total coating powder weight) of a highly cross-linked polyester. It is similar to the previously-described aromatic straight polyester. A suitable composition is about 40 to about 60 mole % THEIC, and about 40 to about 60 mole % aromatic di-acid or di-functional monoanhydride. The particular ingredients previously discussed for the aromatic straight polyester may also be used here. This highly cross-linked polyester can be pre-reacted with the aromatic straight polyester for better flexibility and cut through to form a moderately cross-linked polyester.

V. Flow Control Agent

The coating powder composition preferably includes about 0.1 to about 2% (by weight based on total coating powder weight) of a flow control agent. Suitable flow control agents include sodium alkyl-naphthalene sulfonate sold by Du Pont under the trademark ALKANOL B. The preferred flow control is a polyacrylate sold by Monsanto under the trademark MOD-A-FLOW.

VI. The Coating Powder

A coating powder composition is prepared from a mixture of the polyester-amide-imide, the aromatic polyester, a monomer or pre-polymer, and any optional ingredients. The weight ratio of aromatic polyester to polyester-amide-imide is about 9 to 1 to about 2 to 1 and the weight ratio of monomer or pre-polymer to polyester-amide-imide is about 1 to 6 to about 1 to 9.

The coating powder is prepared by hot melt-mixing the coating powder composition to about 100° to about 150° C, the melting point of the composition. This may most feasibly be accomplished in an extruder and preferably a type of extruder with a reciprocating screw known as a kneader. The hot melt-mixed composition is cooled and ground to a powder. A suitable sieve size is 90% through 200 mesh and 50 to 60% through 325 mesh. The resulting dry, solid powder may then be used like any other coating powder in a fluidized bed, electrostatic fluidized bed, electrostatic spray gun, or other applicator.

The following examples further illustrate the invention. The tests used in the examples are described in NEMA MW-1000. In these examples the coated wire passed into a 6-ft. horizontal Bridgeport oven with a hot spot of 430° C for a precure. On exiting the oven, the wire was cooled by an air blast to prevent its sticking to the sheaves. The precured coated wire then passed into a 12-ft. vertical I tower with a hot spot of 375° C for the final cure. The wire was taken up on standard spooling equipment. Coating speeds generally ranged from 15 to 28 ft/min.

EXAMPLE I

Part 1. Polyester-Amide-Imide

The following ingredients were charged into a reaction flask equipped with stirrer, thermometer, nitrogen sparge, and a steam condenser:

| | |
|---|---|
| 576 | g trimellitic anhydride |
| 527 | g ethylene glycol |
| 150 | g triethylene glycol |
| 244 | g meta phenylene diamine |
| 261 | g tris (2-hydroxy ethyl) isocyanurate |
| 5.0 | g tetra isopropyl titanate |
| 5.0 | g cresylic acid |

The reactants were heated to about 190° C with stirring and nitrogen sparging to clarity. Then 630 g of dimethylterephthalate was added. The reactants were heated from 190° to 220° C at 15° C per hour. The reaction was cooled to about 180° C where 480 g trimellitic anhydride and 196 g maleic anhydride were added. The reaction was heated to about 205° C at 15° C per hour, until a ball and ring of 120° to 125° C was reached. At this point the reaction was stopped by pouring out rapidly into thin sheets for quick cooling. A clear, hard, tack-free material was obtained.

Part 2. Aromatic Straight Polyester

The following ingredients were charged into a flask equipped with stirrer, thermometer, nitrogen sparge, and steam condenser:

| 722 | g ethylene glycol |
|---|---|
| 207 | g triethylene glycol |
| 751 | g tris (2-hydroxy ethyl) isocyanurate |
| 2500 | g dimethyl terephthalate |
| 208 | g tetra isopropyl titanate |
| 10 | g cresylic acid |
| 86.5 | g xylene |

The ingredients were heated rapidly to 160° C and then to about 260° C at 15° C per hour. When a ball and ring of 95° to 105° C was reached the reaction was stopped and the material was poured into thin sheets for rapid cooling. A clear, hard, and tack-free material was obtained.

A thorough blend was then made of 574 g Part 1, 194 g Part 2, 85 g DAPON M and 3.0 g MOD-A-FLOW. This mixture was first run through an extruder at 125° to 135° C, cooled, and then ground into a fine powder. The powder was electrostatically applied to copper magnet wire, pre-cured in a 6-ft. horizontal oven at 400° to 425° C and cured at 375° C in a vertical tower. Properties of the cured film are listed in Table I; it shows excellent flexibility and coatability along with good heat shock.

EXAMPLE II

Part 1. Polyester-Amide-Imide

The following ingredients were charged into a reaction flask equipped with stirrer, thermometer, nitrogen sparge, and a steam condenser:

| 375 | g trimellitic anhydride |
|---|---|
| 488 | g ethylene glycol |
| 127 | g triethylene glycol |
| 205 | g meta phenylene diamine |
| 222 | g tris (2-hydroxy ethyl) isocyanurate |
| 5.0 | g tetra isopropyl titanate |
| 5.0 | g cresylic acid |

The reactants were heated rapidly to about 180° C to a clear solution and then cooled to 160° C where 114 g trimellitic anhydride was added. The reactants were heated to about 190° C to clarity where 341 g dimethyl terephthalate was added and heated to about 220° C at 15° C per hour. The reactants were cooled to 170° C when 245 g trimellitic anhydride and 333 g maleic anhydride were added. The ingredients were heated to about 205° C at 15° C per hour. When a ball and ring of about 120° C was achieved the reaction was stopped and the material was poured into thin sheets for rapid cooling. A clear, hard, tack-free material was obtained.

Part 2. Highly Cross-linked Polyester

The following ingredients were charged into a reaction flask equipped with stirrer, thermometer, nitrogen sparge, and a steam condenser:

| 1677 | g tris (2-hydroxy ethyl) isocyanurate |
|---|---|
| 850 | g dimethyl terephthalate |
| 196 | g maleic anhydride |
| 6.0 | g tetra isopropyl titanate |
| 5.0 | g cresylic acid |

The reactants were heated rapidly to 160° C and then to about 210° C at 15° C per hour. When a ball and ring of about 125° C was achieved the reaction was stopped and the material poured as thin sheets for rapid cooling. A clear, hard, a tack-free material was obtained.

A thorough blend of 280 g Part 1 and 80 g Part 2 of this example along with 200 g Part 2, Example I, 80 g DAPON M, and 2.5 g MOD-A-FLOW. This mixture was then run through an extruder and ground into a fine powder. This powder was electrostatically coated on copper magnet wire and cured as in Example II. Properties of the cured film are listed in Table I; it shows fair flexibility along with excellent thermoplastic flow values. This powder can be applied at heavy build with a single pass.

EXAMPLE III

Moderately Cross-linked Polyester

The following ingredients were charged into a reaction flask equipped with stirrer, thermometer, nitrogen sparge, and a steam condenser:

| 42 | g triethylene glycol |
|---|---|
| 155.5 | g ethylene glycol |
| 560 | g dimethyl terephthalate |
| 150 | g tris (2-hydroxy ethyl) isocyanurate |
| 1.7 | g tetra isopropyl titanate |
| 26 | g xylene |

These ingredients were heated rapidly to 160° C and then to 260° C at 15° C per hour. The reactants were cooled to 200° C where 342 g dimethyl terephthalate, 457 g tris (2-hydroxy ethyl) isocyanurate, 1.7 g tetra isopropyl titanate, and 13 g xylene were added. The reaction was then heated from 170° to 205° C at 15° C per hour to a ball and ring of about 110° C. The reaction was stopped and the material was cooled rapidly by pouring into thin sheets. A clear, hard, and tack-free material was obtained.

A thorough blend of 450 g of Part 1, Example I, 90 g of Part 1, this Example, 60 g of DAPON M, and 3.0 g MOD-A-FLOW was made and run through an extruder at 125° to 135° C. The material was cooled and ground into a fine powder. The powder was electrostatically applied to copper wire as before with properties of the cured film listed in Table I, and shows fair flexibility along with excellent heat shock and thermoplastic flow values.

EXAMPLE IV

Part 1. Polyester-Amide-Imide

The following ingredients were charged into a reaction flask equipped with stirrer, thermometer, nitrogen sparge, and a steam condenser:

| 117.5 | g ethylene glycol |
|---|---|
| 52 | g trimellitic anhydride |

The reactants were heated to 145° C where 125.1 g m-phenylene diamine was added and allowed to melt in after which 216 g trimellitic anhydride was added. The reaction was carried to a temperature of about 190° C where another 30.8 g portion of trimellitic anhydride was added and allowed to react for about 0.5 hour where 84 g of tris (2-hydroxyl ethyl) isocyanurate was added. The reaction was carried to about 220° C when the material was poured into thin sheets for quick cooling. A clear, hard, and tack-free material was obtained.

Part 2. Straight Polyester

The following ingredients were charged into a reaction flask equipped with stirrer, thermometer, nitrogen sparge, and a steam condenser:

| | |
|---|---|
| 214.6 | g ethylene glycol |
| 57.6 | g triethylene glycol |
| 104.3 | g tris (2-hydroxy ethyl) isocyanurate |
| 693.3 | g dimethyl terephthalate |
| 57.6 | g maleic anhydride |
| 4.5 | g tetra isopropyl titanate |

The reactants were heated rapidly to 160° C then to 260° C at 15° C per hour. The reaction was then stopped by pouring into thin sheets for quick cooling. A hard, tack-free material was obtained.

Part 3. Highly Cross-linked Polyester

The following ingredients were charged into a reaction flask equipped with stirrer, thermometer, nitrogen sparge, and a steam condenser:

| | |
|---|---|
| 561 | g tris (2-hydroxy ethyl) isocyanurate |
| 99.3 | g ethylene glycol |
| 425 | g dimethyl terephthalate |
| 98 | g maleic anhydride |
| 3.0 | g tetra isopropyl titanate |

The reactants were heated rapidly to 160° C then to about 210° C at 15° C per hour. The reaction was then stopped by pouring into thin sheets for rapid cooling. A clear, hard, and tack-free material was obtained.

A thorough blend was then made of 180 g Part 2, 90 g Part 3, 270 g of Part 1, 50 g of DAPON M, and 3.0 g of MOD-A-FLOW. This blend was then extruded, cooled, and ground into a fine powder. The powder wa electrostatically deposited on copper wire and cured at 375° C. Table I lists the properties of the cured film; it shows excellent flexibility and coatability along with good heat shock and thermoplastic flow values.

TABLE I

Properties of Electrostatically Coated Powdered Magnet Wire Enamels (Horizontal Application on #18 awg Copper Wire)

| Ex. | Coating Speed | Maximum Build | Flexibility (Elongation + 1X) | Heat Shock | Thermoplastic Flow |
|---|---|---|---|---|---|
| 1 | 15 fpm | 2.3 mils | >30% | 150° C | 210° C |
| 2 | 18 fpm | 3.5 mils | 15% | 125° C | 310° C |
| 3 | 15 fpm | 1.7 mils | 15% | 175° C | 320° C |
| 4 | 15 fpm | 2.1 mils | >30% | 150° C | 252° C |

EXAMPLE V

The following ingredients were charged into a reaction flask equipped with stirrer, thermometer, nitrogen sparge, and a steam condenser:

| | |
|---|---|
| 162 | g trimellitic anhydride |
| 68.5 | g metal phenylene diamine |
| 42 | g triethylene glycol |
| 148 | g ethylene glycol |
| 73.75 | g tris (2-hydroxy ethyl) isocyanurate |
| 1.5 | g tetra isopropyl titanate |

The reactants were heated to 190° C until clarity was achieved. The reaction was then cooled to 170° C when 104.5 g meta phenylene diamine and 216 g trimellitic anhydride was added which is then reacted to 190° C until clarity is achieved. Then 177 g of dimethylterephthalate and 1.5 g tetra isopropyl titanate was added and then reacted to about 220° C at 15° C per hour. The reaction was then cooled to about 180° C when 135 g trimellitic anhydride and 55.2 g maleic anhydride was added. The reaction was carried on at about 190° C for approximately ½ hour. At this point 32.6 g of tris (2-hydroxy ethyl) isocyanurate was added and reacted about 190° C for ½ hour. At this point the reaction was stopped by pouring rapidly into thin sheets. A clear, hard, tack-free material was obtained.

EXAMPLE VI

Moderately Cross-Linked Polyester

The following ingredients were charged into a reaction flask equipped with stirrer, thermometer, nitrogen sparge, and a steam condenser:

| | |
|---|---|
| 31.2 | g triethylene glycol (TEG) |
| 155.5 | g ethylene glycol (EG) |
| 415.8 | g dimethyl terephthalate (DMT) |
| 111.5 | g tris (2-hydroxy ethyl) isocyanurate |
| 1.25 | g IPT in 5 g cresylic acid |

The reactants were rapidly heated to about 160° C and then to about 260° C at 15° C per hour. The reaction was then coated to about 200° C when 254.1 g dimethyl terephthalate and 339.9 g tris (2-hydroxy ethyl) isocyanurate is added. The reaction is carried out from about 200° C to 230° C at 15° C per hour. The reaction is then cooled to 200° C when 12 g of IPT which is in solution with 10 g carbitol is added. (The IPT undergoes some ester interchange with carbitol which is the mono ethyl ether of diethylene glycol.)

EXAMPLE VII

Using the procedure of Example IV, the following compositions were presented:

| Composition | Ingredient (% by weight) | | Type of Ingredient |
|---|---|---|---|
| A | 35% | Example II, Part I | Polyester-amide-imide |
| | 35% | Example I, Part 2 | Straight polyester |
| | 10% | Example II, Part 2 | Highly cross-linked polyester |
| | 20% | DAPON M | Pre-polymer |
| B | 67.5% | Example I, Part 1 | Polyester-amide-imide |
| | 22.5% | Example I, Part 2 | Straight polyester |
| | 10% | DAPON M | Pre-polymer |
| C | 67.5% | Example I, Part 1 | Polyester-amide-imide |
| | 22.5% | Example I, Part 2 | Straight polyester |
| | 10% | DAPON M | Pre-polymer |
| | 1% | Du Pont's TLF 2005 | Organic titanate |
| D | 75% | Example I, Part 1 | Polyester-amide-imide |
| | 15% | Example III, Part 1 | Moderately cross-linked polyester |
| | 10% | DAPON M | Pre-polymer |
| E | 70% | Example V, | Polyester-amide-imide |
| | 20% | Example VI, | Moderately cross-linked polyester |

-continued

| Composition | Ingredient (% by weight) | Type of Ingredient |
|---|---|---|
| | 10% DAPON M | Pre-polymer |
| F | 67.5% Example I, Part 1 | Polyester-amide-imide |
| | 30% Example IV, Part 2 | Straight polyester |
| | 15% Example IV, Part 3 | Highly cross-linked polyester |
| | 10% DAPON M | Pre-polymer |

Coating powders were prepared and tested on #18 awg copper wire as described in Example IV.

The following table gives the properties of the coating powders:

| Composition | Amide-Imide Content | Coating Speed (fpm) | Maximum Build (mil) | Flexibility (HX) | Heat Shock | Thermoplastic Flow |
|---|---|---|---|---|---|---|
| A | 7% | 15.0 | 3.2 | 5% | 125° C | 257° C |
|   |    | 18.0 | 3.2 | 5% | 125° C | 310° C |
|   |    | 21.0 | 3.2 | 5% | 125° C | 349° C |
| B | 15% | 15.0 | 2.3 | >30% | 150° C | 206° C |
|   |    | 18.0 | 2.8 | >30% | 150° C |        |
|   |    | 21.0 | 2.5 | >30% | 150° C | 166° C |
| C | 15% | 18.0 | 2.7 | >30% | 150° C | 327° C |
|   |    | 21.0 | 2.7 | >30% | 150° C |        |
| D | 15% | 15.0 | 2.0 | >30% | 150° C | 262° C |
|   |    | 18.0 | 2.0 | >30% | 150° C |        |
|   |    | 21.0 | 2.0 | >30% | 150° C |        |
| E | 25% | 18.0 | 1.7 | 10% | 175° C | 293° C |
|   |    | 21.0 | 1.4 | 10% | 175° C |        |
| F | 29% | 15.0 | 1.7 | 15% | 175° C | 324° C |
|   |    | 18.0 | 1.7 | 15% | 175° C |        |
|   |    | 21.0 | 1.3 | 15% | 175° C |        |

I claim:

1. A coating prepared by hot melt-mixing, cooling, and grinding
   (A) a coating powder composition which comprises a solventless, aromatic polyester-amide-imide which comprises the reaction product of
      (1) an aromatic diamine;
      (2) about 100 to about 110 mole % (of the stoichiometric amount needed to react with said di-amine) of a trimellitic compound selected from the group consisting of trimellitic anhydride, trimellitic acid, trimellitic acid halide, and mixtures thereof; and
      (3) about 35 to about 100 mole % in excess of the stoichiometric amount needed to react with said trimellitic compound of a polyol, admixed with
   (B) an aromatic straight polyester in a weight ratio of about 9:1 to about 2:1, wherein said aromatic straight polyester is the reaction product of an aromatic straight polyester composition which comprises
      (1) about 25 to about 45 mole % of a non-cyclic polyol having 2 to 3 hydroxyals;
      (2) about 5 to about 15 mole % tris (2-hydroxyethyl)isocyanurate;
      (3) about 40 to about 60 mole % of an aromatic di-acid, di-ester, or di-functional mono-anhydride; and
      (4) about 0.1 to about 0.5 mole % of a catalyst; and
   (C) a reactive aromatic monomer, pre-polymer, or mixtures thereof in a weight ratio (to said polyester-amide-imide) of about 1:6 to about 1:9.

2. A coating powder according to claim 1, wherein said non-cyclic polyol is ethylene glycol.

3. A coating powder according to claim 1, wherein said aromatic di-ester is dimethyl terephthalate.

4. A coating powder according to claim 1, wherein said catalyst is tetra isopropyl titanate.

5. A coating powder according to claim 1, wherein said aromatic straight polyester composition includes up to about 15 mole % of an unsaturated anhydride or di-acid.

6. A coating powder according to claim 5 wherein said unsaturated anhydride is maleic anhydride.

7. A coating powder according to claim 1 wherein said reactive solid aromatic monomer or prepolymer is a pre-polymer of diallyl isophthalate.

8. A coating powder according to claim 1 wherein said coating powder composition includes about 10 to about 15% of a highly cross-linked polyester.

9. A coating powder according to claim 8 wherein said highly cross-linked polyester is pre-reacted with the aromatic straight polyester.

10. A coating powder according to claim 8 wherein said highly cross-linked polyester is the reaction product of a composition which comprises
    about 40 to about 60 mole % THEIC and
    about 40 to about 60 mole % of a compound selected from the group consisting of aromatic di-acids, aromatic di-functional mono-anhydrides, and mixtures thereof.

11. A coating powder according to claim 1 wherein said coating powder composition includes about 0.1 to about 2% of a flow control agent.

12. A coating powder according to claim 1 wherein said trimellitic compound is trimellitic anhydride.

13. A coating powder according to claim 1 wherein said aromatic diamine is meta phenylene diamine.

14. A coating powder according to claim 1 wherein said polyol is selected from the group consisting of tris (2-hydroxyethyl) isocyanurate, a mixture of about 85 to about 95 mole % ethylene glycol, and about 5 to about 15 mole % triethylene glycol, and mixtures thereof.

15. A coating powder according to claim 1 wherein said reaction product includes about 3 to about 25 mole % (based on total moles in total reaction product) of a second aromatic compound selected from the group consisting of mono-anhydride, di-acid, tri-acid, di-ester, and mixtures thereof.

16. A coating powder according to claim 15 wherein said second aromatic compound is a mixture of about 0 to about 75 mole % trimellitic anhydride and about 0 to about 75 mole % dimethylterephthalate (based on total moles in that reaction product).

17. A coating powder according to claim 1 wherein said reaction-product is prepared with about 0.01 to about 1% by weight (based on reaction product weight) of a catalyst.

18. A coating powder according to claim 17 wherein said catalyst is tetra isopropyl titanate.

19. A coating powder according to claim 1 which includes up to about 17 mole % of an unsaturated compound selected from the group consisting of unsaturated monoanhydrides, di-acids, and mixtures thereof.

20. A coating powder according to claim 19 wherein said unsaturated compound is maleic anhydride.

* * * * *